No. 851,126.           PATENTED APR. 23, 1907.
C. H. FORSHEY.
HARROW.
APPLICATION FILED FEB. 12, 1907.
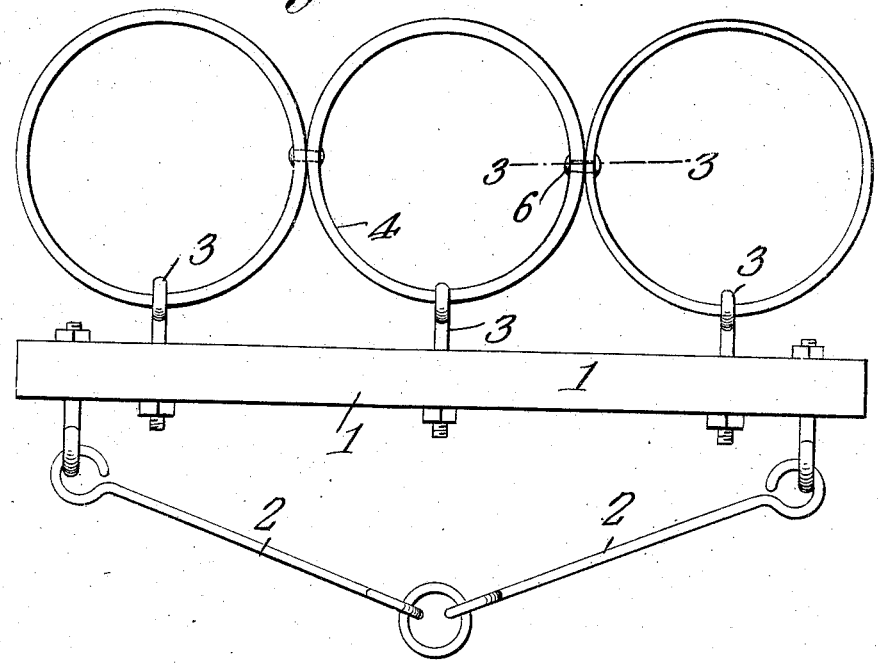
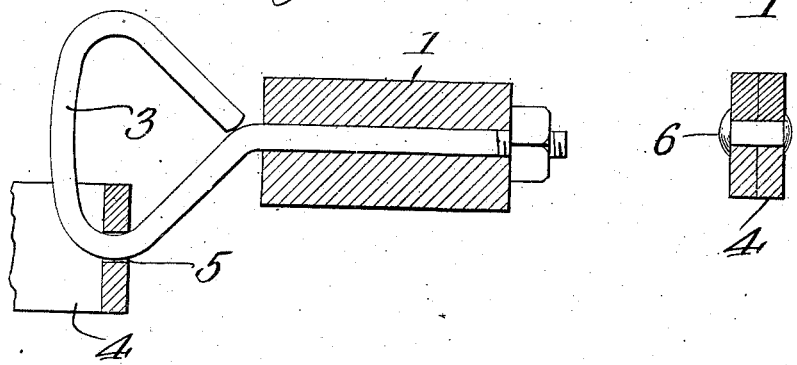
Clifford H. Forshey,
INVENTOR.
WITNESSES:
By C. A. Snow & Co.
ATTORNEYS

UNITED STATES PATENT OFFICE.

CLIFFORD H. FORSHEY, OF PEERLESS, OHIO.

HARROW.

No. 851,126.            Specification of Letters Patent.            Patented April 23, 1907.

Application filed February 12, 1907. Serial No. 357,023.

*To all whom it may concern:*

Be it known that I, CLIFFORD H. FORSHEY, a citizen of the United States, residing at Peerless, in the county of Delaware and State of Ohio, have invented a new and useful Harrow, of which the following is a specification.

This invention has relation to harrows and it consists in the novel construction and arrangement of its parts as hereinafter shown and described.

The object of the invention is to provide a harrow which is composed of a series of bands made of sheet metal and pivotally connected at their sides directly together and linked to a cross bar. The bands are made of strips which are pivotally connected together by bolts. Suitable means are provided for attaching draft animals to the cross bar. The bands are arranged to pass along the surface of the ground with their lower edges in contact with the same and as the bands pass over the tops of furrows they drag the earth from the said tops into the valleys between the furrows and thus cut and level the soil.

In the accompanying drawings, Figure 1 is a top plan view of the harrow. Fig. 2 is a transverse sectional view through the bar of the same, and Fig. 3 is a sectional view of the bands cut on the line 3–3 of Fig. 1.

The harrow consists of the bar 1 to which are attached the links 2, 2 which serve as draft means for the implement. The eyes 3, 3 are attached to the said bar 1 and are disposed rearwardly with relation to the same. Each of the bands 4 is provided with a perforation 5 which receives one of the eyes 3. The bolts 6 secure the sides of the bands directly together. The said bolts serve as pivots whereby the said bands may turn with relation to each other. Thus it will be seen that as the implement is drawn over the ground the lower edges of the band will cut into the surface thereof and drag the top soil and fill up depressions. The pivotal connections between the bands affording such flexibility as to enable the bands to move along the surface of uneven ground without forcing one or more of the bands to cut too deep below the surface.

The advantages of the present invention are its simplicity of construction and incidental cheapness and when not in use the eyes 3 may be removed from the cross bar 1 and together with the bands may be hung up upon pegs when the implement is stored out of the way and takes up but small space.

Having described my invention, what I claim as new, and desire to secure by Letters Patent, is—

1. A harrow comprising a bar, eyes attached to the bar, bands attached to the eyes and bolts pivotally connecting the sides of the bands directly together.

2. A harrow comprising a bar, eyes attached to the bar, bands having perforations which receive said eyes and bolts pivotally connecting the sides of the bands directly together.

In testimony that I claim the foregoing as my own I have hereto affixed my signature in the presence of two witnesses.

CLIFFORD H. FORSHEY.

Witnesses:
     C. H. BISHOP,
     RAY B. BISHOP.